(12) United States Patent
Brill et al.

(10) Patent No.: US 6,628,835 B1
(45) Date of Patent: Sep. 30, 2003

(54) METHOD AND SYSTEM FOR DEFINING AND RECOGNIZING COMPLEX EVENTS IN A VIDEO SEQUENCE

(75) Inventors: Frank Z. Brill, Plano, TX (US); Thomas J. Olson, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/379,986

(22) Filed: Aug. 24, 1999

Related U.S. Application Data

(60) Provisional application No. 60/098,475, filed on Aug. 31, 1998.

(51) Int. Cl.[7] .............................. G06K 9/68; G06K 9/00; H04N 7/18
(52) U.S. Cl. ..................... 382/226; 382/103; 348/155
(58) Field of Search .................................. 382/218, 219, 382/224, 225, 226, 103; 348/142, 143, 152, 153, 154, 155; 386/69; 340/511

(56) References Cited

U.S. PATENT DOCUMENTS

| | | | | |
|---|---|---|---|---|
| 5,666,157 A | * | 9/1997 | Aviv ........................... 348/152 |
| 5,828,809 A | * | 10/1998 | Chang et al. ................. 386/69 |
| 5,969,755 A | * | 10/1999 | Courtney .................... 348/143 |
| 6,107,918 A | * | 8/2000 | Klein et al. ................. 340/511 |
| 6,295,367 B1 | * | 9/2001 | Crabtree et al. ............ 382/103 |

* cited by examiner

*Primary Examiner*—Mehrdad Dastouri
(74) *Attorney, Agent, or Firm*—Robert D. Marshall, Jr.; W. James Brady, III; Frederick J. Telecky, Jr.

(57) ABSTRACT

Given a system which detects simple events, one can define a complex event by constructing a list of sub-events. In order to recognize a complex event, the system keeps a record of the sub-events that have occurred thus far and the objects involved in these sub-events. Whenever the first sub-event in a complex event's sequence is recognized, an activation for that complex event is created. The activation contains an indication of the identity of the object involved in the event. The activation also includes an index initialized to one. If a newly detected event matches the next sub-event in any of the currently open complex events, the index for that complex event is incremented. If the index reaches the total number of sub-events in that complex event, the complete complex event is recognized. Thus any desired alarm is generated. Since the complex event that was just recognized may also be a sub-event of another complex event, the activation lists are consulted again to see if the indices of any other complex event activations can be advanced.

6 Claims, 4 Drawing Sheets

| Name : | Loiter by the door |
|---|---|

Events: ☐ enter ☐ exit ☒ loiter ☐ alone ☐ leave ☐ deposit ☐ remove
☐ move ☐ rest ☐ incar ☐ outcar ☐ lightsout ☐ lightson Objects: ☒ person ☐ box ☐ briefcase ☐ notebook ☐ car ☐ object ☐ unknown Days of week: ☐ Monday ☐ Tuesday ☐ Wednesday ☐ Thursday
☐ Friday ☐ Saturday ☐ Sunday Time of day: from 12:00 am until 12:00 am Regions: ☐ PC_area ☒ outside_the_door ☐ phone_area Duration: 5.0

Actions: ☐ beep ☒ log ☐ flash ☐ plot ☒ voice ☐ popup

[ OK ] [ Cancel ]

*FIG. 6*

Name : Theft   ordered

Loiter by the door
Deposit/Remove
Leave the computer
Deposit
Exit
Loiter by the phone
Enter
Lights On/Off
cmonitor1
Remove Enter
Remove
~Deposit
Exit Actions: ☐ beep ☐ log ☐ flash ☐ plot ☒ voice ☐ popup

[ OK ] [ Cancel ]

METHOD AND SYSTEM FOR DEFINING AND RECOGNIZING COMPLEX EVENTS IN A VIDEO SEQUENCE

This application claims priority under 35 USC §119(e)(1) of Provisional Application No. 60/098,475, filed Aug. 31, 1998.

TECHNICAL FIELD OF THE INVENTION

The technical field of this invention is automatic security systems particularly automatic security systems employing computer image processing for detecting complex events in a video sequence.

BACKGROUND OF THE INVENTION

Commercially available video event detection systems use change detection to generate alarms. Since such systems generate an alarm when any motion occurs in the monitored area, incidental motion or change in lighting can generate false alarms. Recent advances in video monitoring technology enable the detection of more specific events than just motion, such as when a person enters a room, deposits or picks up an object, or loiters for a while in a given area. Although the events these advanced systems detect are more sophisticated than those detected via motion detection, they are still unstructured events that are detected regardless of the context in which they occur. This can result in alarms being generated on events that are not of interest.

For example, if a system is monitoring a room or store with the intention of detecting theft, the system could be set up to generate an alarm whenever an object is picked up. However, no theft has occurred unless the person leaves the area with the object. A simple, unstructured event detection system would generate an alarm every time someone picked up an object. This would result in many false alarms. Therefore there is a need in the art for a system that can recognize complex events an thus filter out false positive alarms.

SUMMARY OF THE INVENTION

Given a system which detects simple events, one can easily create a user interface that enables someone to define a complex event by constructing a list of sub-events. After one or more complex events have been defined, the sub-events of complex events defined later can be complex events themselves. As an alternative user interface, complex events could be constructed in a top-down fashion, defining the highest-level complex event first, and then recursively defining the sub-events until all of the lowest-level events are simple.

Once the user has defined the complex events and the actions to take when they occur, the event detection system must recognize these events as they occur in the monitored area. For the purposes of this application, assume a priori that the simple events can be recognized and that the object involved in them can be tracked. The preferred embodiment uses the method discussed above to recognize the simple events or any other suitable prior art technique. In order to recognize a complex event, the system must keep a record of the sub-events that have occurred thus far and the objects involved in these sub-events. Whenever the first sub-event in a complex event's sequence is recognized, an activation for that complex event is created. The activation contains an indication of the identity of the object involved in the event. The activation also includes an index, which is the number of sub-events in the sequence that have been recognized thus far. The index is initialized to 1 when the activation is created, since the activation is only created when the first sub-event of that complex event is detected. The system maintains a list of current activations for each defined complex event type. Whenever any new event is detected, the list of current activations is consulted to see if the newly detected event matches the next sub-event in any of the currently open complex events. If so, the index for that complex event is incremented. If the index reaches the total number of sub-events in the sequence for that complex event, the complete complex event has been recognized. Thus any desired alarm is generated. Since the complex event that was just recognized may also be a sub-event of another complex event, the activation lists are consulted again to see if the indices of any other complex event activations can be advanced.

BRIEF DESCRIPTION OF THE DRAWINGS

These and other aspects of this invention are illustrated in the drawings, in which:

FIG. 6 illustrates a user interface enabling the user to select which events are to form the complex event via a dialog box interface; and FIG. 7 illustrates a user interface enabling a user to define a complex event via a dialog box interface.

DETAILED DESCRIPTION OF PREFERRED EMBODIMENTS

Figure 1:
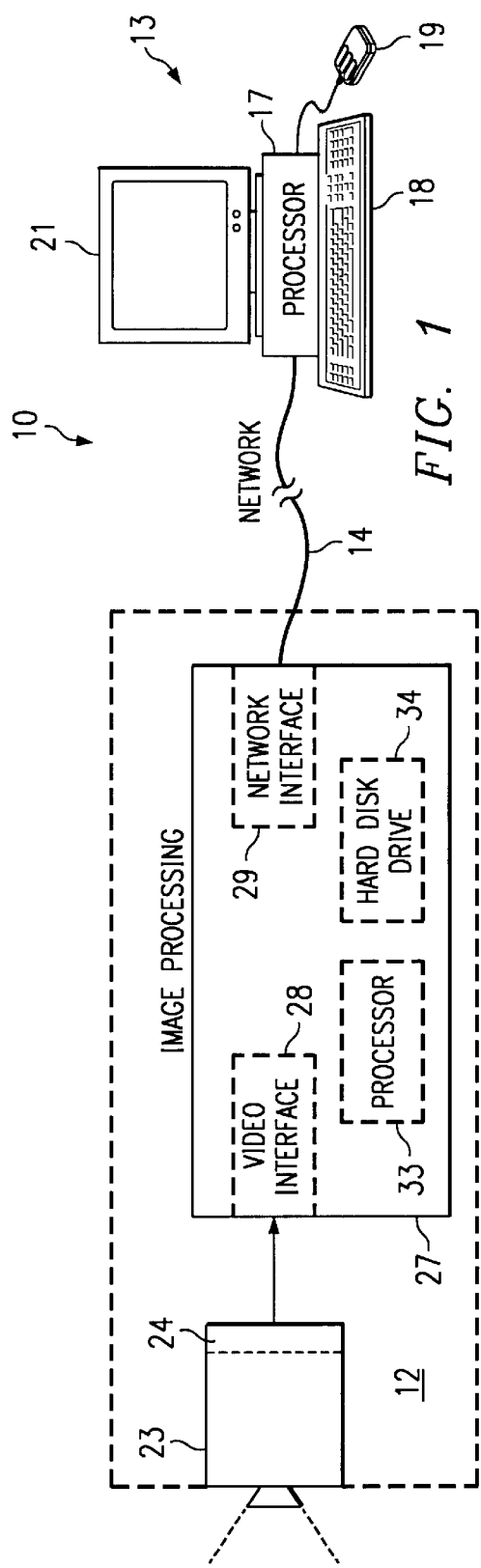
FIG. 1 is a diagrammatic view of a surveillance system used monitor activity in a selected region or area.

FIG. 1 is a diagrammatic view of a surveillance or monitoring system 10 which embodies the present invention, and which is used monitor activity in a selected region or area. The monitoring system 10 also includes a camera unit 12, a computer workstation 13, which are operatively coupled by a network shown schematically at 14. The network 14 may be a local area network, the Internet, some other type of network, a modem link or a combination of these technologies. The computer workstation 13 may be a personal computer including a processor 17, a keyboard 18, a mouse 19 and a display unit 21.

The camera unit 12 includes video camera 23. Video camera 23 in the disclosed embodiment is a known monochrome camera that outputs gray-scale images. However, the present invention may be utilized with a color video camera or some other type of two-dimensional image detector, such as an infrared detector. Video camera 23 includes detector 24. Detector 24 may be a charge coupled device (CCD) or a CMOS image detector as known in the art. Video camera 23 not-illustrated includes optics of a known type, which focuses an image on detector 24.

Camera unit 12 further includes an image processing section 27. The image processing section 27 includes a video interface circuit 28 to receive the output of image detector 24. A network interface 29 facilitates communication across network 14. Image processing section 27 could also include a modem in addition to or in place of network interface 29. This would enable communications via a telephone line. Image processing section 27 further includes a processor 33. Processor 33 preferably consists of a digital signal processor and its corresponding volatile memory. Image processing section 27 includes a non-volatile memory such as hard disk drive 34 illustrated in FIG. 1. Hard disk drive 34 could optionally be replaced or supplemented by another suitable type of non-volatile memory such as FLASH memory, EPROM memory or DRAM memory with battery backup.

In the preferred embodiment, image processing section 27 is co-located in the same physical housing as camera 23. Thus camera unit 12 is a stand alone device which may be directly coupled to network 14. However, it will be recognized by those skilled in the art that image processing section 27 could alternatively be implemented within computer workstation 13 and physically separate from camera 23. In this alternative, computer workstation 13 preferably includes a plug-in video capture card serving a video interface and a plug-in network interface card for communication via network 14. Though the embodiment disclosed includes a single camera 23, it is possible to provide plural cameras with a single image processing section.

The basic system performs three data processing steps for every image of a video sequence to recognize events. The three steps are detecting objects, tracking objects, and analyzing the motion graph.

Once objects are detected in a video image, the next step is to track each object through the video sequence. This task is done by linking objects in the previous frame to their corresponding objects in the current frame. Correspondence is established by matching objects with their nearest neighbors. The path of links which follows a given object through successive frames is called an object's track. The objects and their tracks create a directed graph which represents the history of the motion of the objects in a video sequence. This directed graph is called a motion graph. The goal of this step is to create a motion graph for use by the next step in event recognition.

Finally, to recognize events, the system analyzes the motion graph. The preferred, embodiment of the system recognizes the following vocabulary of events: ENTER, EXIT, REST, MOVE, DEPOSIT, REMOVE, LIGHTS-ON and LIGHTS-OUT. These events are examples of the most common in an office environment where the main interaction is between people and smaller stationary objects. Other examples would be applicable to monitoring outdoors, such as a parking lot.

The image processing section 27 analyzes the motion graph by tracking movement or non-movement of each identified change region through a succession of the frames or images from the video camera. For purposes of facilitating an understanding of the present invention, one known motion analysis technique will be briefly summarized with reference to FIG. 2. Although it will be recognized that motion analysis in the video images is carried out in two dimensions, for purposes of convenience the diagram of FIG. 2 shows just one dimension.

Figure 2:
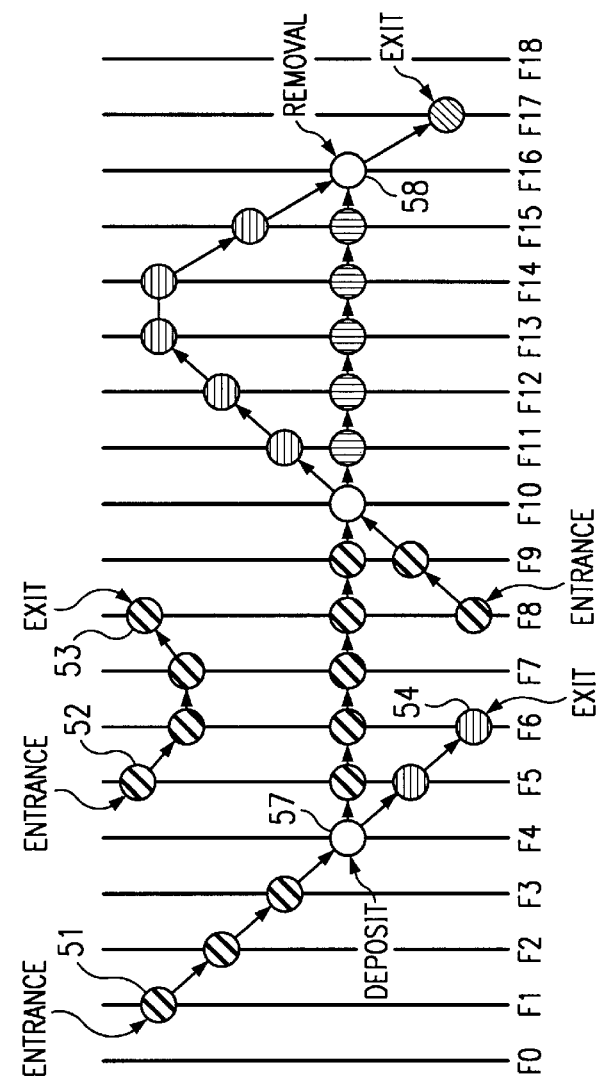
FIG. 2 illustrates an example of one known motion analysis technique.

In FIG. 2, the nineteen vertical lines F0 through F18 each represent a respective frame or image in a series of successive images from the video camera 12. In FIG. 2, the horizontal, dimension represents time, and the vertical dimension represents one dimension of movement of an object within a two-dimensional image. When an object which was not previously present first appears, for example at 51 or 52, it is identified as an entrance or ENTER event. When an object which was previously present is found to no longer be present, for example at 53 or 54, it is designated an EXIT event. If an existing object splits into two objects, one of which is moving and the other of which is stationary, for example as at 57, it is designated a DEPOSIT event. This would occur, for example, when a person who is carrying a briefcase sets it down on a table, and then walks away.

If a moving object merges with a stationary object, and then continues to move while the stationary object disappears, as at 58, it is designated a REMOVE event. This would correspond to a situation where a person walks to a notebook resting on a table, and then picks up the notebook and walks away.

Three other types of events, which are not specifically illustrated in FIG. 2, are a REST event, a MOVE event, and a LIGHTS-OUT event. A REST event occurs when a moving object comes to a stop but continues to be present without moving. A practical example is a situation where the objects being monitored are vehicles in a parking lot, and a car pulls into a parking space and thereafter remains stationary. A MOVE event occurs when a detected object which has been stationary begins moving again, for example when a car that has been parked begins moving. A LIGHTS-OUT event occurs when the entire detected image suddenly changes, for example when the lights in a monitored room are turned out and the room becomes dark.

In the present invention the surveillance system can be programmed to only generate an alarm upon the occurrence of a complex event made up of a series of simple events. Returning to the THEFT example, a better system would generate an alarm only when the REMOVE event is followed by an EXIT event. The EXIT event provides context for the REMOVE event that enables the system to filter out uninteresting cases in which the person does not leave the area with the object they picked up. This application describes the invention of such a complex event detection system.

In the subsequent discussion, the term simple event means an unstructured atomic event. Detection of these events is known in the art and such detection is described above. A complex event is structured, in that it is made up of one or more sub-events. The sub-events of a complex event may be simple events, or they may be complex, enabling the definition of event hierarchies. Event may refer to either a simple or a complex event. In our theft example above, REMOVE and EXIT are simple events, and THEFT is a complex event. A user may also define a further event, for example CRIME-SPREE, which may have one or more complex THEFT events as sub-events.

Given a system which detects simple events, the invention creates a user interface that enables someone to define a complex event by constructing a list of sub-events. After one or more complex events have been defined, the sub-events of complex events defined later can be complex events themselves. As an alternative user interface, complex events could be constructed in a top-down fashion, defining the highest-level complex event first, and then recursively defining the sub-events until all of the lowest-level events are simple.

Figure 3:
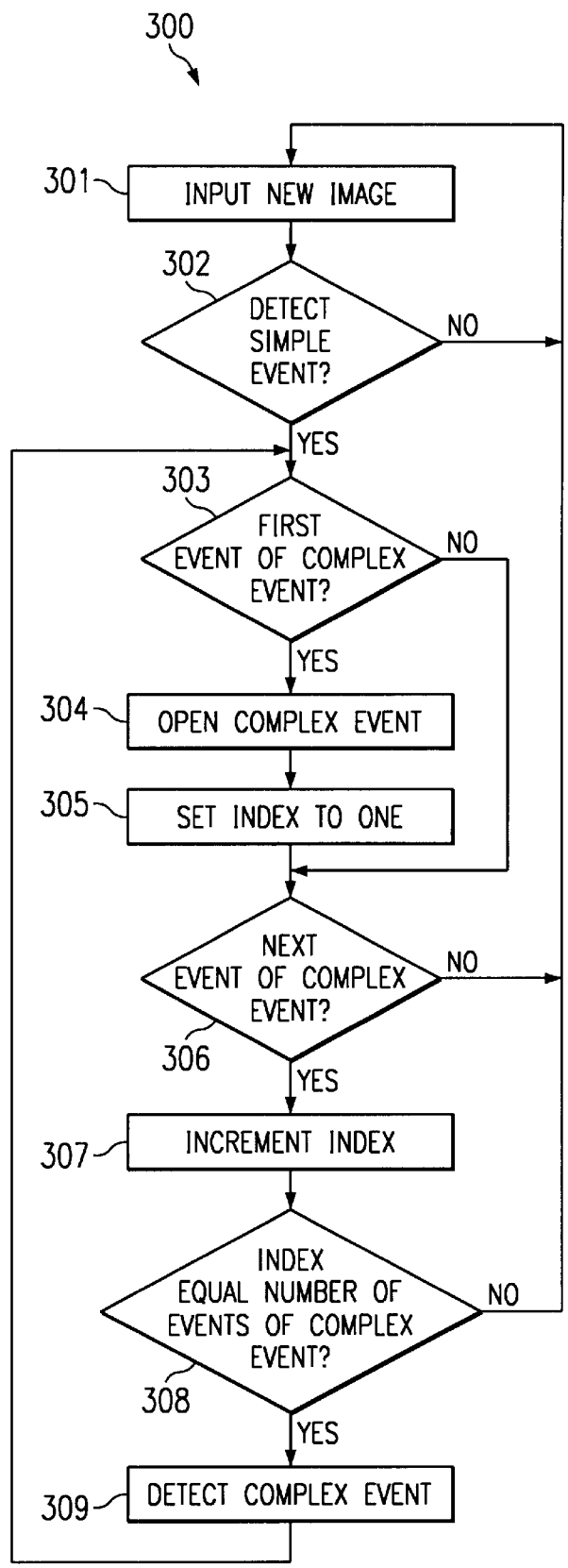
FIG. 3 illustrates in flow chart form the process of detection of complex events.

FIG. 3 illustrates the process 300 for detecting complex events. Once the user has defined the complex events and the actions to take when they occur, the event detection system must recognize these events as they occur in the monitored area. For the purposes of this disclosure, assume a priori that the simple events can be recognized and that the object involved in them can be tracked (process blocks 301 and 302). The preferred embodiment uses the method any suitable prior art technique. In order to recognize a complex event, the system must keep a record of the sub-events that have occurred thus far, and the objects involved in them. Whenever the first sub-event in a complex event's sequence is recognized (decision block 303), an activation for that complex event is created (processing block 304). The activation contains the ID of the object involved in the event, and an index, which is the number of sub-events in the sequence that have been recognized thus far. The index is initialized to 1 when the activation is created (processing block 305), since the activation is only created when the first sub-event matches. The system maintains a list of current activations for each defined complex event type. Whenever any new event is detected, the list of current activations is consulted to see if the newly detected (or incoming) event matches the next sub-event in the complex event (decision block 306). If so, the index is incremented (processing block 307). If the index reaches the total number of sub-events in the sequence (decision block 308), the complete complex event has been recognized (processing block 309), and any desired alarm can be generated. Also, since the complex event that was just recognized may also be a sub-event of another complex event, the activation lists are consulted again (decision block 303) to see if the indices of any other complex event activations can be advanced. Otherwise, the process returns to input the next image (processing block 301) and repeats.

To return to our THEFT example, the complex THEFT event has two sub-events, REMOVE and EXIT. When a REMOVE event occurs, an activation for the THEFT event is created, containing the identity of the person involved in the REMOVE event and an index set to 1. Later, when another event is recognized by the system, the activation is consulted to see if the event type of this newly detected event matches the next sub-event in the sequence. In this example the next sub-event in THEFT is EXIT. If the event type matches, the object identity is also checked. In this example, the object identity is checked to see if the person EXITing is the same as that of the person who earlier REMOVEd the object. This prevents signaling a THEFT event when one person picks up an object and a different person exits the area. In a closed environment, the object identities used may merely be the track IDs. Each object that enters the monitored area is assigned a unique track ID, and this track ID is discarded when the object is no longer being tracked. If both the event type and the object ID match, the activation's index is incremented to 2. Since there are only 2 sub-events in the complex event in this example, the entire complex-event has been recognized, and an alarm is generated if desired. Since the THEFT event has been recognized, this newly recognized THEFT event may be a sub-event of another complex event. When the complex THEFT event is recognized, the current activations are recursively checked to see if the theft is a part of another higher-level event, such as a CRIME-SPREE.

This is the basic mechanism for defining and detecting complex events. There are several variants on this basic mechanism, some of which will be described next. The first variation is to allow unordered events. It may be desirable to signal an alarm if and only if all of the sub-events in a complex event are detected involving a given object, regardless of the order in which they occur. The complex event is the logical conjunction of the sub-events. To implement this case, the activation consists of an object ID and a list of the sub-events that have not yet been detected. As each sub-event is detected, it is deleted from the activation's list. If the list becomes empty, the complete unordered complex event has occurred. It may also be useful to define a complex event that is signaled if any of the complex event's sub-events is detected. The complex event is the logical disjunction of its sub-events. In this case, the concept of an activation is not needed. If any of the sub-events is detected, then the complex event is recognized immediately.

Another variation is the concept of negated sub-event. Considering the THEFT example, if the person pays for the item, then it is not a theft. If the person puts the item back down before leaving, then it is also not a theft. A more complete definition of THEFT is one in which a person picks up an item and then leaves without putting it back or paying. This complex event can be expressed as an ordered, complex event with negated sub-events. Assume the system can detect the simple events REMOVE, DEPOSIT, PAY, and EXIT. The complex THEFT event can now be expressed as the ordered list:

1. REMOVE
2. ~DEPOSIT
3. ~PAY
4. EXIT where the "~" symbol indicates negation. Thus THEFT is detected if a person REMOVEs an object and EXITs without either DEPOSITing that object or PAYing. The user interface for defining complex events can easily be augmented to allow the users to negate some of the sub-events. The complex event recognition system may need to be enhanced to handle negated sub-events.

Figure 4:
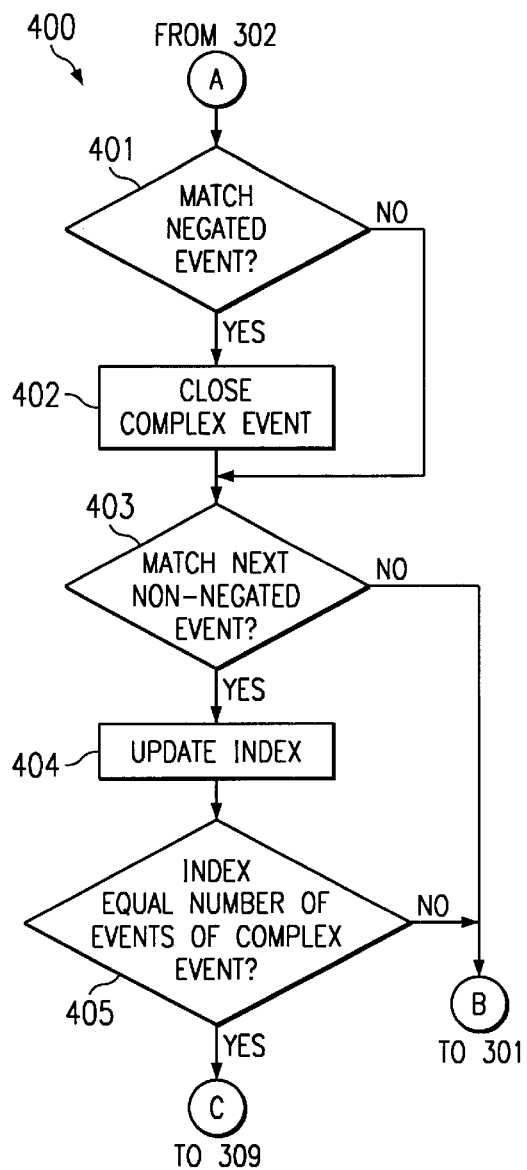
FIG. 4 illustrates in flow chart form part of the process of detecting complex events having negated events.

FIG. 4 illustrates a part of the process 400 of detecting complex events having negated events. The process 400 takes place following detection of simple events (processing block 302). When the initial event of a complex event is detected, an activation for the complex event is created as before, and as subsequent events are detected, they are checked to see if they match the next sub-event. At first the negation is ignored. The system checks to see if the incoming event matches the non-negated version of the next sub-event (decision block 401). However, the action taken based on a match is different than for non-negated events. If there is a match, instead of incrementing the index as with the non-negated sub-events, the activation is deleted (processing block 402).

If the next sub-event in the sequence is negated, and the incoming event does not match, then the action to take is more complicated. The system now considers the next sub-event and see if it is also negated. If that one also is a negated event, the systems continues again to the next sub-event to see if it matches. The system continues in this fashion as long as the next sub-event in the sequence is negated and the incoming event does not match it. If the system ever matches a negated sub-event (decision block 401), the activation is canceled (processing block 402). When reaching a non-negated sub-event, the system checks for a match to the event (decision block 403). If a match is found, the system updates the activation's index (processing block 404). The case of reaching the end of the sub-event list without encountering a non-negated sub-event will be discussed later. The updated value of the activation's index depends on whether the incoming event matches this non-negated sub-event. If the incoming event matches the non-negated sub-event, then the index is advanced past the negated sub-events up to the just-matched non-negated sub-event. If the incoming event does not match the non-negated sub-event, the index is left unchanged. This means that the system will check all of the negated sub-events again when a new incoming event is detected. As before, if a non-negated event is detected the system checks to determine if the index reaches the total number of sub-events in the sequence (decision block 405). If so, this complex event is detected as before (processing block 309). If not the loop repeats.

This is illustrated using our THEFT example again. Recall that our definition of the THEFT event is the 4 sub-event sequence (REMOVE, ~DEPOSIT, ~PAY, EXIT). Let's say a person has picked up an object, so there is a THEFT activation with index 1. If the next event that is detected is LOITER, the system first checks to see if the incoming LOITER event matches DEPOSIT. Since it doesn't, and DEPOSIT is negated in this event definition, the system moves to the next sub-event and checks if the incoming LOITER matches PAY, which it doesn't. Since PAY is also negated, the system advances again to see if LOITER matches EXIT, which it doesn't. Since EXIT is not negated in this case, and doesn't match, checking for this incoming event is complete. The system leaves the index unchanged at 1. If the system recognizes another LOITER event, or any other event which is neither DEPOSIT, PAY, nor EXIT, the system will go through this entire process again and the index will remain at 1.

If the system detects a DEPOSIT or PAY event involving the appropriate person and object, the activation would be canceled. Intuitively, since the person put the object back down or paid for it, no theft can occur. If the person picks up another object, then the system will instantiate a new activation. So the matching of a negated sub-event cancels the activation.

If the system detects an EXIT of the appropriate person and the activation has not been canceled, since the index is still 1, then the system attempts to match the incoming EXIT event to DEPOSIT and PAY (which do not match), and finally attempt to match EXIT, which succeeds. Since a match to the non-negated sub-event has been detected, the index is set to the index of the matched sub-event. In this case the index would be changed from 1 to 4. Since the complex event in this example has 4 sub-events, and the index is now 4, the entire complex event has been matched, and system has recognized the THEFT event. Intuitively, there has been a REMOVE and an EXIT with no intervening DEPOSIT or PAY; this is the definition for theft.

Another application of the complex event with negated sub-events is to detect suspicious behavior in front of a building. The normal behavior may be for a person to park the car, get out of it, and then come up into the building. If the person parks the vehicle and leaves the area without coming up into the building, this may be a car bombing scenario. If the system can detect the sub-events for PARK, OUTCAR, ENTER-BUILDING, and EXIT, the car-bombing scenario can be defined as (PARK, OUTCAR, ~ENTER-BUILDING, EXIT).

Consider a different car bombing scenario in which two cars pull up in front of the building, and a person gets out of one car and into the other, which drives away. One car remains which may contain the bomb. This scenario may be defined as (PARK, OUTCAR, INCAR, EXIT), in which the INCAR and OUTCAR are for the same person changing cars. The EXIT event is for the getaway car leaving the scene. However, this definition would also match the event in which the person gets back into the same car and drives away, which should not be a car bomb event. The INCAR and OUTCAR events must involve the same person but different cars. The mechanism discussed thus far has no provision for specifying that objects involved be different. In fact, they are all assumed to be the same, and our poorly defined car bombing scenario will only be detected if the person gets in and out of the same car, which is not the desired complex event.

This problem can be resolved if the complex event detection system is augmented to allow the user to label the objects involved in the event. If the labels given to objects in the event definition are the same, this indicates that the objects involved are required to be same object, whereas if the labels are different, the objects are required to be different. The user can also indicate that it doesn't matter whether the objects are the same, perhaps by leaving the label blank. For events such as OUTCAR which involve more than one object (the person and the car), multiple labels must be provided, perhaps with an ordering convention to resolve which label corresponds to the car, and which corresponds to the person. OUTCAR(P, C) could mean that person P got out of car C. Using the labeling mechanism, the user could correctly define our new car bombing scenario as (PARK(A), OUTCAR(P, A), INCAR(P, B), ~EXIT(A), EXIT(B)). Intuitively, this says that a car parks, a person gets out of it, and that person then gets into a different car. The second car exits the scene but the first does not. The fact that the label P is used in both the INCAR and OUTCAR events indicates that the same person is involved in both events, whereas the use of the different labels for cars requires that the cars be different. To make the event definition more clear, one might use mnemonic labels for the cars such as CAR-BOMB and GETAWAY-CAR.

Some events may not have objects associated with them. For example, a LIGHTS-OUT event can be detected without reference to any object. Such events will always match, without checking any object Ids. Alternately, one could think of such events as having an implicit object in which the label is left blank to indicate a don't-care condition.

For yet another variant on complex event detection, return to the THEFT example. Imagine that a person picks up two things and leaves without paying for either of them. Should the THEFT event be signaled once or twice? The answer depends on the particular application, so either possibility may be allowed by the system. As described thus far, a THEFT alarm defined as:

1. ENTER(person)
2. REMOVE(person, item)
3. ~DEPOSIT(person, item)
4. ~PAY(person, item)
5. EXIT(person)

would be signaled once. A person P enters, which creates an activation (P, 1). The person removes an item, which matches the second sub-event, so the activation is updated to ((P, I1)), 2). Note that since there are multiple objects involved in the event, the activation must identify the objects that have been involved so far. In unification pattern matching parlance, this corresponds to variable binding. The ENTER event binds person P to the person variable, and the REMOVE event binds the item I1 to the variable item. These variable bindings are reflected in the activation.

If the person picks up additional items, the activation will remain ((P, I1), 2). When the person exits (assuming they neither put the item down nor paid for it) the activation will be updated to ((P, I1), 5), and the THEFT event will be signaled once, no matter how many items were stolen. If the theft event is to be signaled for each item stolen, the complex event detection algorithm can be modified to manipulate the activations differently. When a sub-event is matched, instead of advancing a single activation by incrementing its index, the system can create a new activation with an incremented index, and leave the old one where it is. Consider the theft example in this situation. The person enters and the activation (P, 1) is created as before. Now when the person picks up an item, a new activation ((P, I1), 2) is created, and the old activation (P, 1) remains. Now there are two activations associated with person P: (P, 1) and ((P, I1), 2). When the person picks up another item, the existence of activation (P, 1) causes the system to match against the REMOVE sub-event again, so that yet another activation ((P, I2), 2) is created, and (P, 1) still remains. Now there are three activations, (P, 1), ((P, I1), 2), and ((P, I2), 2). Every time another object is removed, yet another activation ((P, Ij), 2) is created, each of which only differs in the item removed. All of these activations are checked every time a new event occurs. When the person exits without paying for anything, all of the activations ((P, Ij), 2) cause the creation of yet more activations ((P, Ij), 5). All of these activations have now reached the end of the complex event, and so the theft event is signaled on each of them.

This use of multiple activations comes at a cost of maintaining all of the additional activations, and may result in more events being signaled than is desired. However, the previous method in which a single activation is updated can potentially fail to signal a complex event that has occurred. For example, consider the case of the theft in which a person picks up two items, I1 and I2. There is only a single activation current, the one for the first item removed: ((P, I1), 2). If the person puts down item I1, this matches ~DEPOSIT at index 3, and the activation is canceled, although person still has I2 in his possession. Since there is no activation which indicates that the person picked up I2, the person can exit the scene and steal I2 without generating a THEFT event. This trades correctness for efficiency, which may be acceptable in some circumstances, but should only be done carefully and when necessary. The use of multiple activations should be the default behavior, since it will generate all matched alarms. More efficient implementations which achieve the effect of multiple activations may also be possible.

A final issue to be resolved is how to handle negated sub-events when they are the first or last event in a complex event. Consider the complex event:

1. ~LOITER(person)
2. DEPOSIT(person, object)
3. ~INCAR(car, person)

This event should be signaled when a person deposits an object in the scene, provided that the person was not loitering beforehand, and does not get into a car afterward. If a person comes into the scene and loiters, they should not be eligible to trigger this complex event. However, our method for handling negated events is to delete the activation. In this case, the negated sub-event is the first sub-event, so there is no activation to delete. Moreover, if the person later deposits an object, there is no record of the fact that the person has loitered. Thus an activation may be created when the person deposits an object even though the person has loitered in the past.

Figure 5:
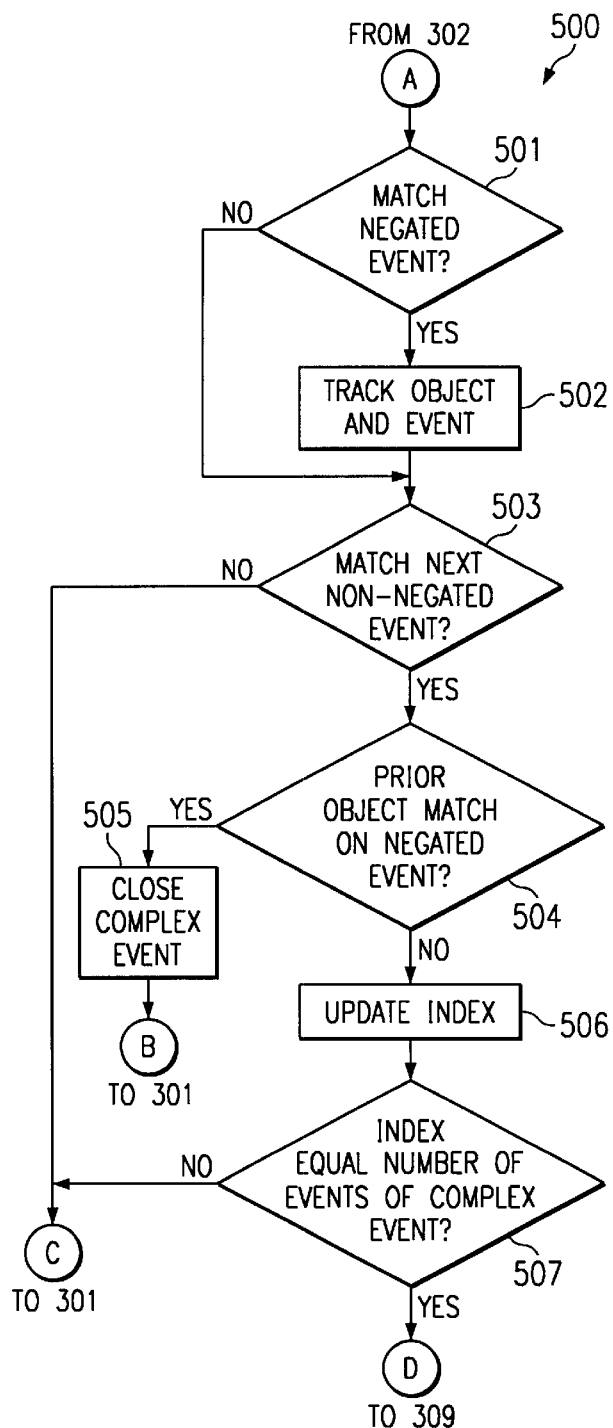
FIG. 5 illustrates in flow chart form part of the process of detecting complex events having an initial negated event.

FIG. 5 illustrates a part of the process 500 of detecting complex events having initial negated events. There must be a special case when the first sub-event is negated. In this case, each time a new event occurs, the system attempts to match all of the initial negated sub-events (decision block 501). Note that there may be more than one initial negated event. If one matches, the system records that fact on a special list that indicates that the object is disqualified from triggering this complex event (procession block 502). If none of the initial negated sub-events matches, the system checks to see if the first non-negated sub-event matches (decision block 503). If so, the system creates an activation with the index set to the index of this matched non-negated sub-event. The system also checks to see if the object has been previously disqualified by matching one of the negated events (decision block 504). If so the complex event activation is canceled (processing block 505), because the object does not match the negated event. If the object is not disqualified, then the index is updated (processing block 506) and the system checks whether the complex event is complete (decision block 507).

In the case of the example above, when person P deposits object O, the system first consults the special list to see that this person has not loitered. If the person has not loitered, the system attempts to match the new event (DEPOSIT) with the first sub-event (LOITER), which fails, and since this sub-event is negated, the system proceeds to check against the next sub-event (DEPOSIT), which succeeds, so the system creates the activation ((P, O), 2). Now, the only remaining sub-event is negated, so the complex event should be signaled as long as the person doesn't get into a car. The question is, how long does the system wait to see if the person gets into a car? If the system doesn't wait at all, this essentially ignores the negated sub-event at the end. If the system waits indefinitely, the complex event will never be signaled. Some reasonable options are to wait a certain amount of time, e.g. ten minutes, or to wait until the person is no longer being tracked in the scene. In either case, while the system waits, it can continue to check incoming events to see if they match the negated sub-event(s) at the tail end of the complex event definition, in which case the system cancels the activation. Otherwise, if the system reaches the end of the wait interval and the activation still exists, the system signals that the complex event has occurred.

The details of the method for defining and recognizing complex events have now been described. The remainder of this application will describe the current implementation of the user interface. The user can select which events are to form the complex event via the dialog box interface illustrated in FIG. 6. The user selects the event type, object type, time, location, and duration of the event to be defined using a mouse. The user can also select an action for the system to take when the event is recognized. This dialog box defines one simple event of the complex event sequence. An arbitrary number of different simple events can be defined via multiple uses of the dialog box. The illustration below shows a dialog box defining an event called "Loiter by the door." This event is triggered when a person loiters any day of the week at any time in the area near the door for more than 5 seconds. This event will generate a voice alarm and write a log entry when the specified event occurs. If the event is only being defined in order to be used as a sub-event in a complex event, the user might not check any action box. No action will be taken when the event is recognized except to see if it matches the next sub-event in another complex event activation or generate a new activation if it matches the first sub-event in a complex event.

After one or more simple events have been defined, the user can define a complex event via the dialog box illustrated in FIG. 7. The user provided name of the complex event being defined is shown in the "Name:" dialog box. This user provided name is used in storing the definition of the complex event. This input screen presents two lists. The first list on the left is a scrolling list of all the event types that have been defined thus far. This list will generally include both user defined events and system primitive events. The second list on the right is a list of the sub-events of the complex event being defined. The sub-event list is initially blank when defining a new complex event. When the user double-clicks with the left mouse button on an item in the event list on the left, it is added as the next item in the sub-event list on the right. When the user double-clicks with the right mouse button on an item in the event list on the left, that item is also added to the sub-event list on the right, but as a negated sub-event. The event name is prefixed with a tilde (~) to indicate that the event is negated.

In the upper right corner of the complex event definition dialog box is an option menu via which the user indicates how the sub-events are to be combined. The default selection is "ordered" to indicate sequential processing of the sub-events. The other options include "all" and "any." If "all" is selected, the complex event will be signaled if all of the sub-events are matched, regardless of order. Such a complex event is simply the conjunction of the sub-events. If "any" is selected, the complex event occurs if any of the sub-events occurs. Such a complex event is the disjunction of the sub-events. At the bottom of the dialog box, the user can select the action to take when the complex event is recognized. The user can save the entire set of event definitions to a file so that they may be read back in at a later time. Labeling of the objects involved in the events as described above is not illustrated in this example.

Once a simple or complex event has been defined, the system immediately begins recognition of the new events in real time, and taking the actions specified by the user. The system provides a functioning realization of the complex event recognition method described in this disclosure.

What is claimed is:

1. A computer implemented method for recognizing complex events in a sequence of video images comprising the steps of:

defining at least one complex event as an ordered list of a predetermined number of events;

recognizing simple events in the sequence of video images;

upon recognition of a simple event determining if said recognized simple event is a first event in said set ordered list of events of a complex event, and if so activating a complex event recognition process for said corresponding complex event and initializing an index for said complex event recognition process to 1;

determining if said recognized simple event is a next event in said ordered list of events of an activated complex event recognition process, and if so logging said recognized event in said complex event recognition process and incrementing said index of said complex event recognition process; and determining if all events in an activated complex event recognition process have been detected by determining if said corresponding index equals said predetermined number of events in said corresponding complex event, and if so recognizing said corresponding complex event.

2. The computer implemented method of claim 1, wherein:

said step of defining at least one complex event comprises defining a complex event including another defined complex event;

said method further comprises upon recognition of a complex event determining if said recognized complex event is a first event in said ordered list of events of another complex event, and if so activating a recognition process for said corresponding complex event and initializing an index for said other complex event recognition process to 1;

determining if said recognized complex event is a next event in said ordered list of events in an activated complex event recognition process, and if so logging said recognized event in said complex event recognition process and incrementing said index of said complex event recognition process; and determining if all events in an activated complex event recognition process have been detected by determining if said corresponding index equals said predetermined number of events in said corresponding complex event, and if so recognizing said corresponding complex event.

3. The computer implemented method of claim 1, wherein:

said step of defining a complex-event comprises defining a complex event includes at least one negated event;

said method further comprises the steps of upon recognition of an event determining if said recognized event matches a non-negated event corresponding to a next negated event in said ordered list of an activated complex event recognition process, if so deactivating said complex event recognition process, and if not determining if said recognized event matches a next non-negated event of an activate complex event recognition process, and if so logging said recognized event and all intervening negated events in said complex event recognition process and incrementing said index for said recognized event and for each intervening negated event.

4. The computer implemented process of claim 3, wherein:

said step of defining a complex event includes an initial negated event; and said method further comprises determining if said recognized event matches a non-negated event corresponding to said initial negated event of a complex event, and if so disqualifying a corresponding tracked object relative to said corresponding complex event.

5. The computer implemented process of claim 3, wherein:

said step of defining a complex event includes a final negated event; and said method further comprises upon detection of a final non-negated event in said corresponding complex event, recognizing said complex event if no detection of said negated event occurs within a predetermined period of time.

6. The computer implemented process of claim 3, wherein:

said simple events include an EXIT event wherein an object previously present in said sequence of video images is no longer present;

said step of defining a complex event includes a final negated event; and said method further comprises upon detection of a final non-negated event in said corresponding complex event, recognizing said complex event if no detection of said negated event occurs before a corresponding object EXITs.

* * * * *